United States Patent
Ruan et al.

(10) Patent No.: US 6,469,603 B1
(45) Date of Patent: Oct. 22, 2002

(54) ELECTRONICALLY SWITCHING LATCHING MICRO-MAGNETIC RELAY AND METHOD OF OPERATING SAME

(75) Inventors: Meichun Ruan, Tempe; Jun Shen, Phoenix, both of AZ (US)

(73) Assignee: Arizona State University, Tempe, AZ (US)

( * ) Notice: Subject to any disclaimer, the term of this patent is extended or adjusted under 35 U.S.C. 154(b) by 0 days.

(21) Appl. No.: 09/596,608

(22) Filed: Jun. 19, 2000

Related U.S. Application Data

(62) Division of application No. 09/496,446, filed on Feb. 2, 2000.
(60) Provisional application No. 60/155,757, filed on Sep. 23, 1999.

(51) Int. Cl.[7] .............................................. H01H 51/22
(52) U.S. Cl. ......................................... 335/78; 257/531
(58) Field of Search ........................... 335/78; 257/414, 257/421, 531; 336/200

(56) References Cited

U.S. PATENT DOCUMENTS

| | | |
|---|---|---|
| 4,570,139 A | 2/1986 | Kroll |
| 5,398,011 A | 3/1995 | Kimura et al. |
| 5,472,539 A | 12/1995 | Saia et al. |
| 5,475,353 A * | 12/1995 | Roshen et al. ................. 335/78 |
| 5,629,918 A | 5/1997 | Ho et al. |
| 5,818,316 A | 10/1998 | Shen et al. |
| 5,847,631 A | 12/1998 | Taylor et al. |
| 6,016,092 A * | 1/2000 | Qiu et al. ..................... 335/262 |
| 6,084,281 A * | 7/2000 | Fullin et al. ................. 257/422 |
| 6,094,116 A * | 7/2000 | Tai et al. ........................ 335/78 |
| 6,124,650 A * | 9/2000 | Bishop et al. ................. 335/78 |
| 6,143,997 A * | 11/2000 | Feng et al. ................... 200/181 |

FOREIGN PATENT DOCUMENTS

| | | |
|---|---|---|
| DE | 19 820821 C | 12/1999 |
| EP | 0 780 858 A | 6/1997 |
| EP | 0 869 519 A | 10/1998 |
| JP | 6-251684 * | 6/1994 |
| JP | 06251684 A | 9/1994 |
| WO | 97 39468 A | 10/1997 |
| WO | 98 34269 A | 8/1998 |
| WO | 99 27548 A | 6/1999 |

OTHER PUBLICATIONS

International Search Report; Jun. 5, 2001.
William P. Taylor, Oliver Brand, and Mark G. Allen, "Fully Integrated Magnetically Actuated Micromachined Relays", Journal of Microelectromechanical Systems, vol. 7, No. 2, Jun. 1998, pp. 181–191.
John A. Wright, Yu–Chong Tai, and Shih–Chia Chang, "A Large–Force, Fully–Integrated MEMS Magnetic Actuator", 1997 International Conference on Solid–State Sensors and Actuators, chicago, Jun., 1997, pp. 793–796.
Tilmans, et al., "A Fully–Packaged Electromagnetic Microrelay", IEEE 1999, pp. 25–30.

(List continued on next page.)

*Primary Examiner*—Lincoln Donovan
(74) *Attorney, Agent, or Firm*—Snell & Wilmer L.L.P.

(57) ABSTRACT

According to various embodiments of the invention, a relay is suitably formed to exhibit an open state and a closed state. The relay is operated by providing a cantilever sensitive to magnetic fields such that the cantilever exhibits a first state corresponding to the open state of the relay and a second state corresponding to the closed state of the relay. A first magnetic field may be provided to induce a magnetic torque in the cantilever, and the cantilever may be switched between the first state and the second state with a second magnetic field that may be generated by, for example, a conductor formed on a substrate with the relay.

23 Claims, 8 Drawing Sheets

OTHER PUBLICATIONS

Xi–OQing Sun, K.R. Farmer, and W.N. Carr, "A Bistable Microrelay Based on Two–Segment Multimorph Cantilever Actuators", 1998 IEEE, pp. 154–159 (No Month).

Ezekiel, J.J. Kruglick and Kristofer S.J. Pister, "Bistable MEMS Relays and Contract Characterization", Hilton Head 98 and 19th International Conference on Electric Contact Phenomena, 5 pgs.

"Ultraminature Magnetic Latching To–5 SPDT DC to C Band" Series RF 341, Product Information of Teledync Relays, (No Month).

Chong H. Ahn and Mark G. Allen, "A Fully Integrated Micromagnetic Actuator With A Multilevel Meander Magnetic Actuator With A Multilevel Meander Magnetic Core", Jun. 1992, IEEE Solid–State Sensor and Actuator Workshop, pp. 14–17.

William P. Taylor and Mark G. Allen, "Integrated Magnetic Microrelays: Normally Open, Normally Closed, and Multi–Pole Devices", Jun. 1997, IEEE International Conference on Solid–State Sensors and Actuators, pp. 1149–1152.

Jack W. Judy and Richard S. Muller, "Magnetically Actuated, Addressable Microstructures", Sep. 1997, Journal of Microelectromechanical Systems, vol. 6, No. 3, Sep. 1997, pp. 249–255.

John A. Wright and Yu–Chong Tai, "Micro–Miniature Electromagnetic Switches Fabricated Using MEMS Technology", 46th Annual International Relay Conference: NARM '98, Apr. 1998.

John A. Wright and Yu–Chong Tai and Gerald Lilienthal, "A Magnetostatic MEMS Switch For DC Brushless Motor Commutation", Solid State Source and Actuator Workshop 1998, Jun. 1998.

Laure K. Lagorce, Oliver Brand, and Mark G. Allen, "Magnetic Microactuators Based on Polymer Magnets", IEEE Journal of Microelectromechanical Systems, vol. 8, No. 1, Mar. 1999, pp. 2–9.

E. Fullin, J. Gobet, H.A.C. Tilmans, and J. Bergqvist, "A New Basic Technology for Magnetic Micro–Actuators", pp. 143–147, (No Date).

"P10D Electricity & Magnetism Lecture 14", Internet Source: http://scitec.uwichill.edu.bb/cmp/online/P10D/Lecture14/lect14.htm, Jan. 3, 2000, pp. 1–5.

Richard P. Feynman, "There's Plenty of Room at the Bottom", Dec. 29, 1959, pp. 1–12, Internet Source: http://www.zyvex.com/nanotech/feynman.html.

William Trimmer, "The Scaling of Micromechanical Devices", Sensors and Actuators, vol. 19, No. 3, Sep. 1989, pp. 267–287, taken from the Internet Source: http://home.e-arthlink.net/–trimmerw/mems/Scale.html.

* cited by examiner

ELECTRONICALLY SWITCHING LATCHING MICRO-MAGNETIC RELAY AND METHOD OF OPERATING SAME

This application is a Divisional of U.S. application Ser. No. 09/496,446, filed Feb. 2, 2000, which claims priority of Provisional Application Serial No. 60/155,757 filed Sep. 23, 1999.

FIELD OF THE INVENTION

The present invention relates to relays. More specifically, the present invention relates to latching micro-magnetic relays with low power consumption and to methods of formulating and operating micro-magnetic relays.

BACKGROUND OF THE INVENTION

Relays are typically electrically controlled two-state devices that open and close electrical contacts to effect operation of devices in an electrical circuit. Stated another way, relays typically function as switches that activate or de-activate portions of an electrical, optical or other device. Relays are commonly used in many applications including telecommunications, radio frequency (RF) communications, portable electronics, consumer and industrial electronics, aerospace, and other systems.

Although the earliest relays were mechanical or solid-state devices, recent developments in micro-electro-mechanical systems (MEMS) technologies and microelectronics manufacturing have made micro-electrostatic and micro-magnetic relays possible. Such micro-magnetic relays typically include an electromagnet that energizes an armature to make or break an electrical contact. When the magnet is de-energized, a spring or other mechanical force typically restores the armature to a quiescent position. Such relays typically exhibit a number of marked disadvantages, however, in that they generally exhibit only a single stable output (i.e. the quiescent state) and they are not latching (i.e. they do not retain a constant output as power is removed from the relay). Moreover, the spring required by conventional micro-magnetic relays may degrade or break over time.

Another micro-magnetic relay is described in U.S. Pat. No. 5,847,631 issued to Taylor et al. on Dec. 8, 1998, the entirety of which is incorporated herein by reference. The relay disclosed in this reference includes a permanent magnet and an electromagnet for generating a magnetic field that intermittently opposes the field generated by the permanent magnet. Although this relay purports to be bi-stable, the relay requires consumption of power in the electromagnet to maintain at least one of the output states. Moreover, the power required to generate the opposing field would be significant, thus making the relay unsuitable for use in space, portable electronics, and other applications that demand low power consumption.

A bi-stable, latching relay that does not require power to hold the states is therefore desired. Such a relay should also be reliable, simple in design, low-cost and easy to manufacture.

SUMMARY OF THE INVENTION

According to various embodiments of the invention, a relay is suitably formed to exhibit an open state and a closed state. The relay is operated by providing a cantilever sensitive to magnetic fields such that the cantilever exhibits a first state corresponding to the open state of the relay and a second state corresponding to the closed state of the relay. A first magnetic field may be provided to induce a magnetic torque in the cantilever, and the cantilever may be switched between the first state and the second state with a second magnetic field that may be generated by, for example, a conductor formed on a substrate with the relay.

BRIEF DESCRIPTION OF THE DRAWING FIGURES

The above and other features and advantages of the present invention are hereinafter described in the following detailed description of illustrative embodiments to be read in conjunction with the accompanying drawing figures, wherein like reference numerals are used to identify the same or similar parts in the similar views, and:

Figure 3A:
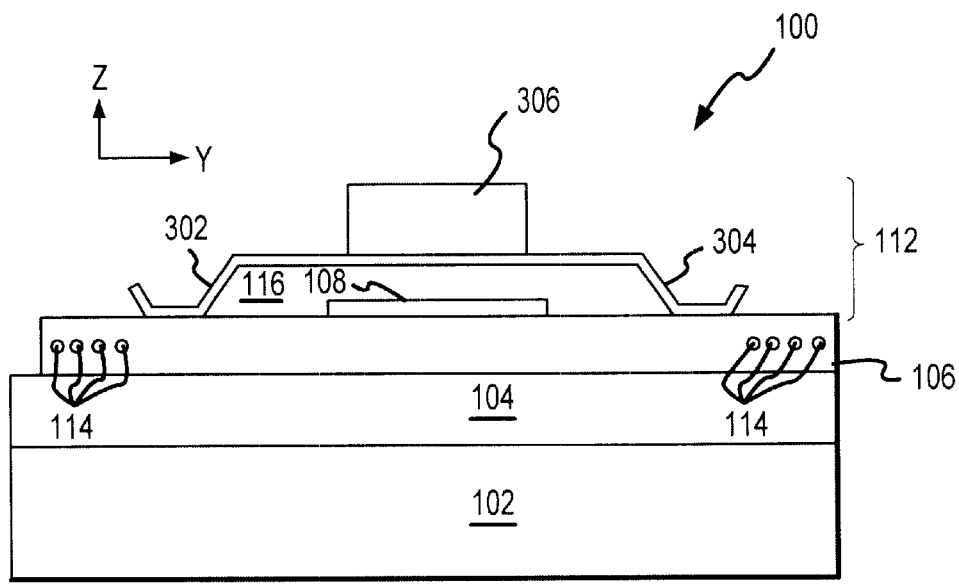
Figure 3B:
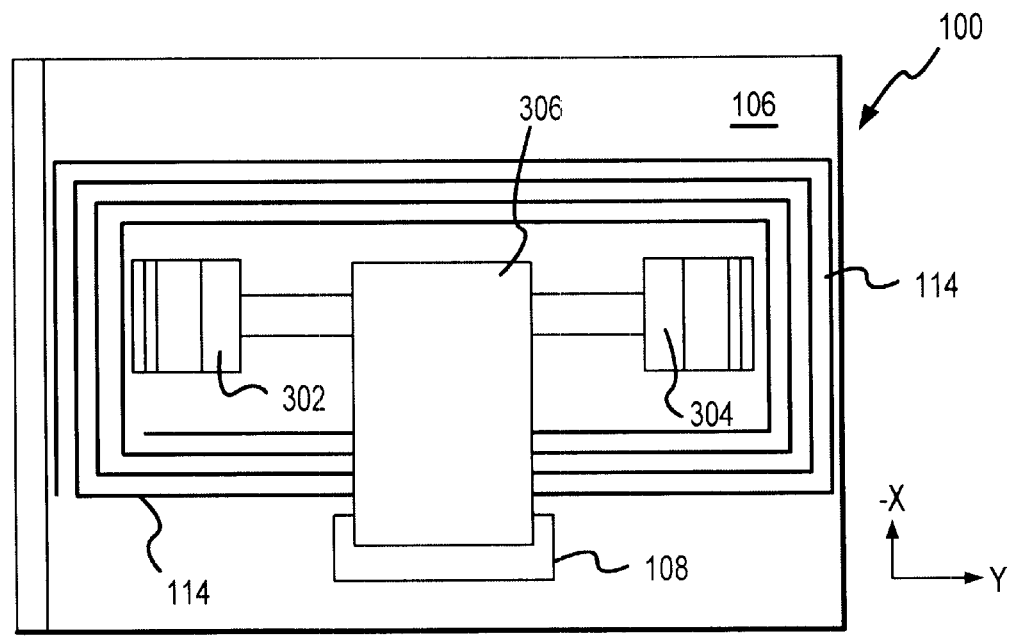
Figure 3C:
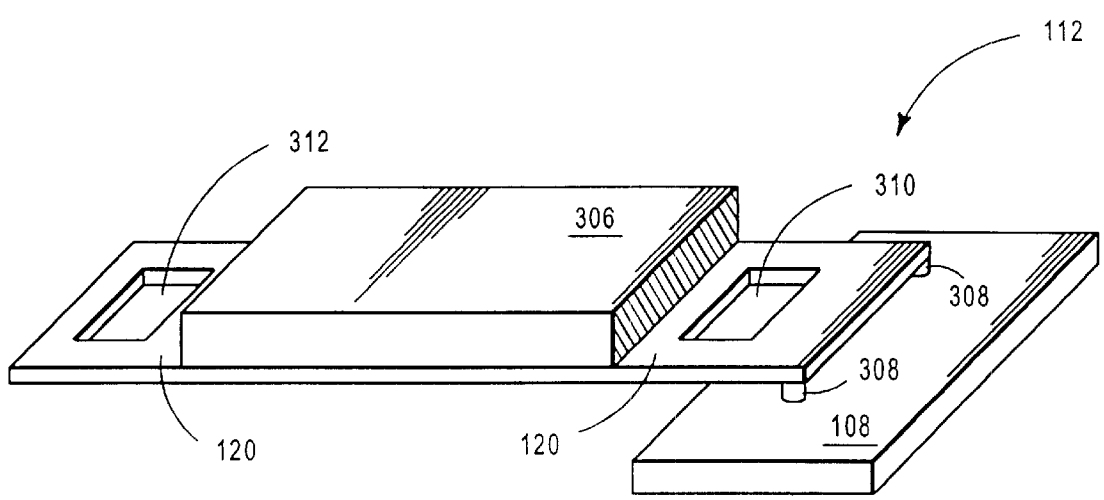
Figure 4A:
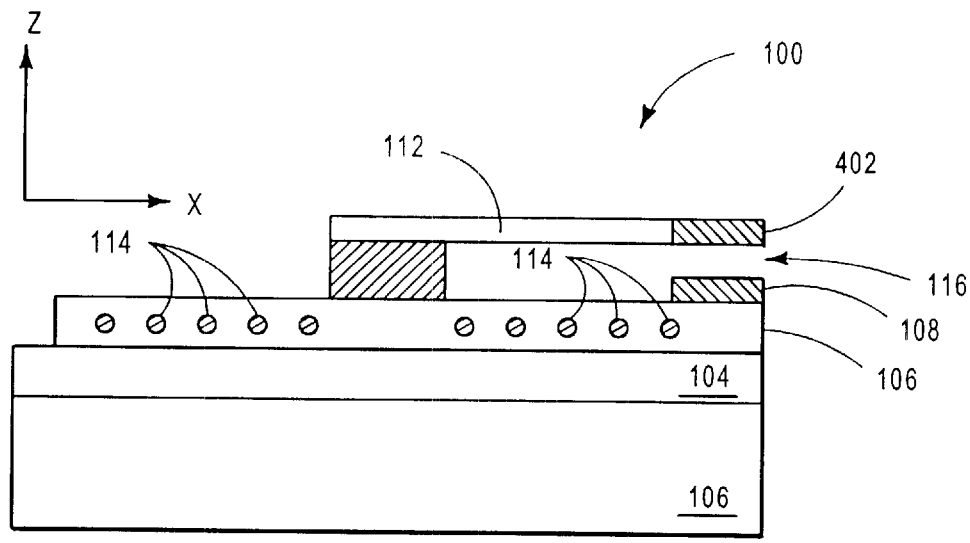
Figure 4B:
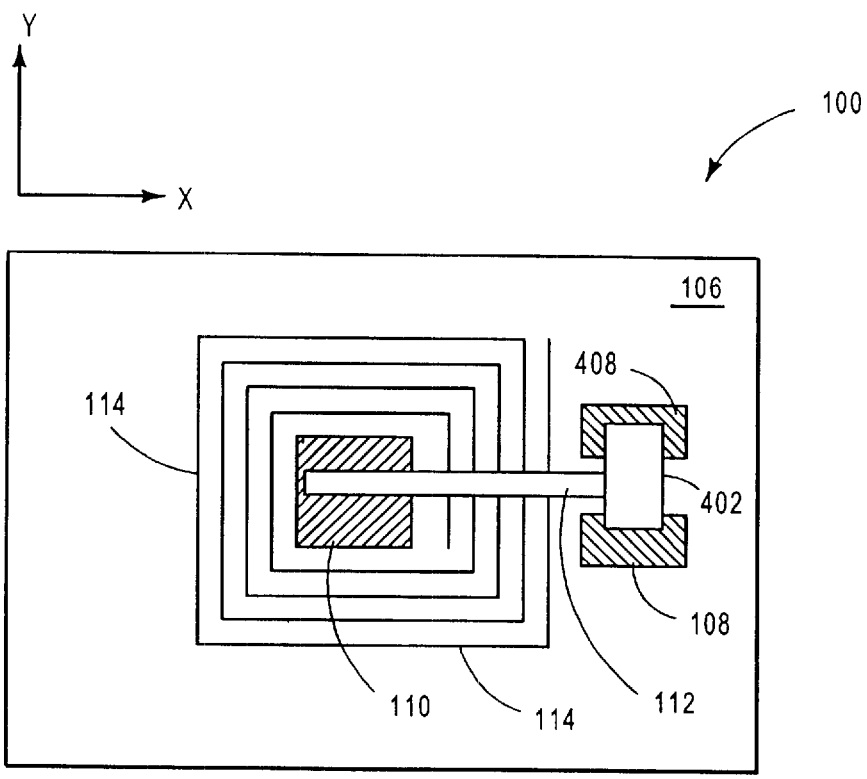
Figure 4C:
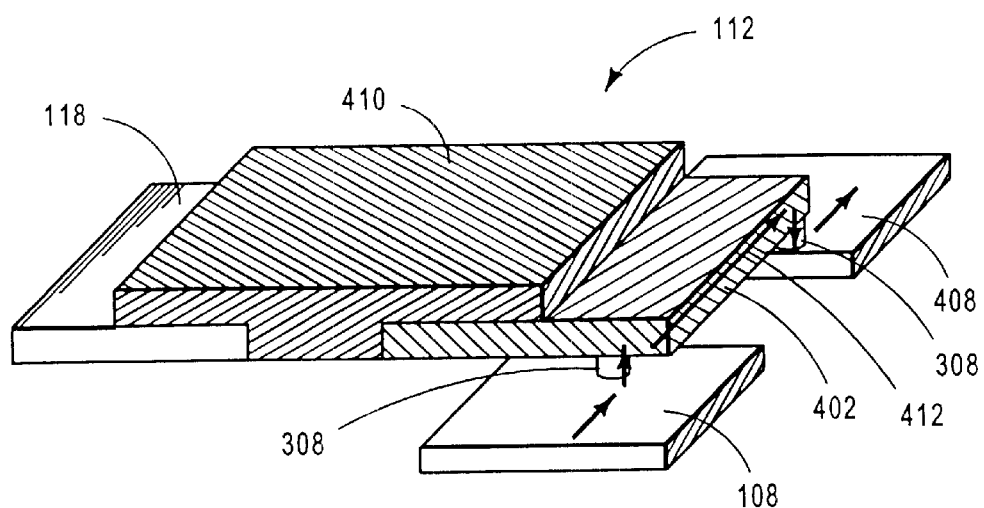
Figure 4D:
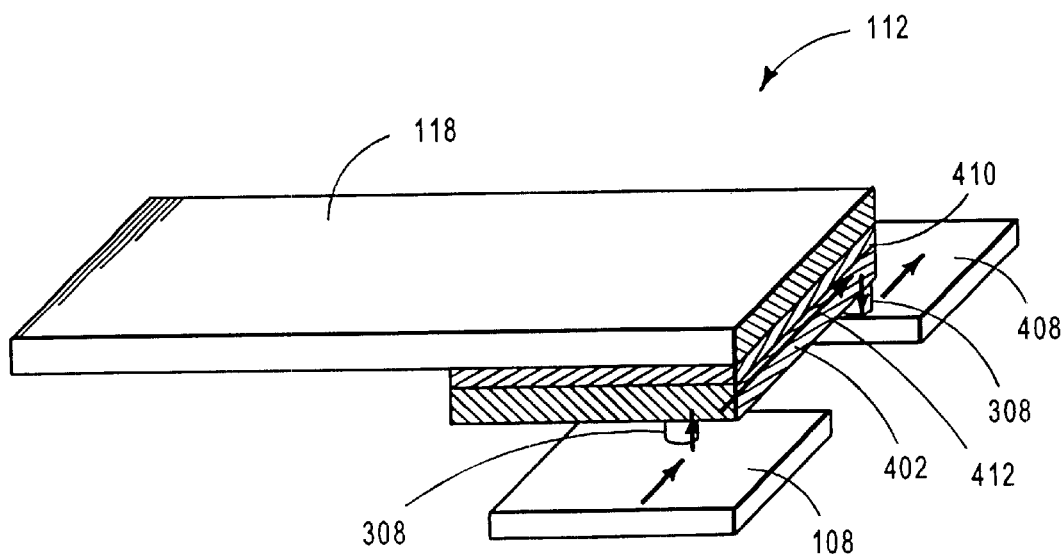
Figure 5:
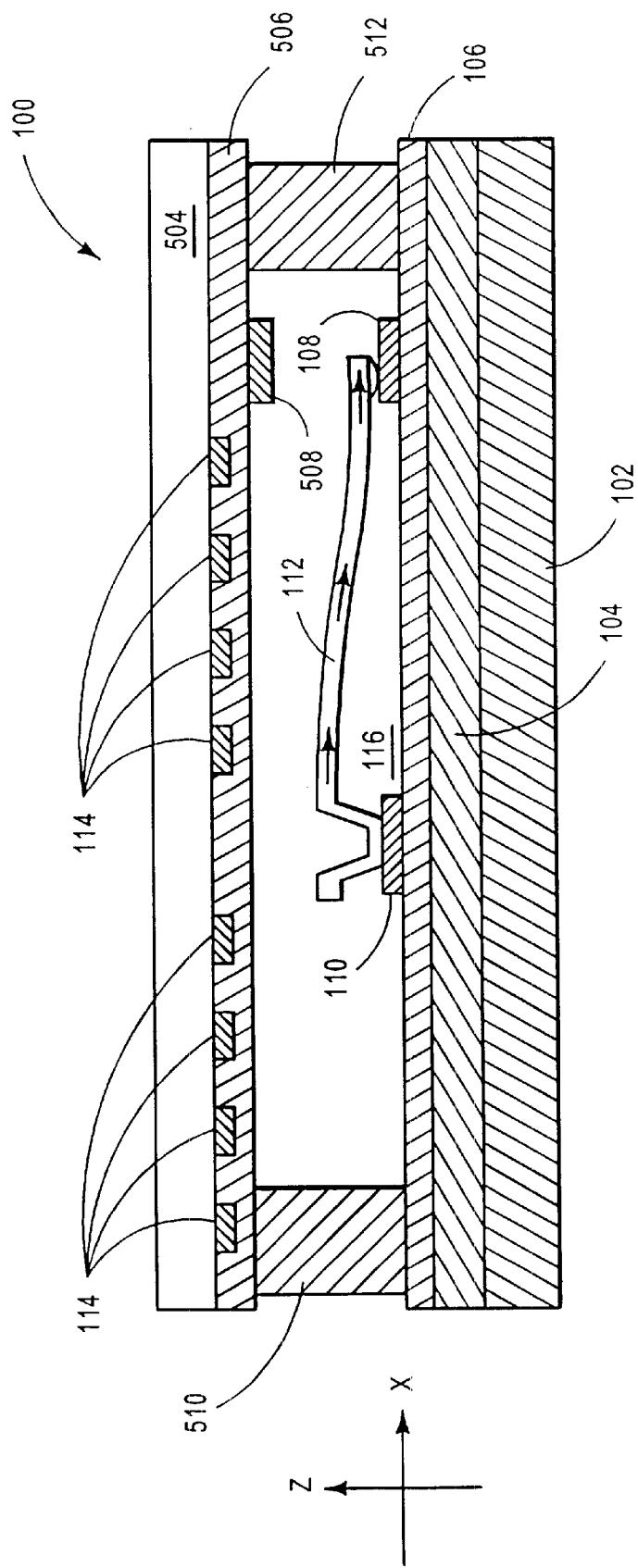

FIGS. 2A–H are side views showing an exemplary technique for manufacturing a latching relay;

FIG. 3A is a side view of a second exemplary embodiment of a latching relay;

FIG. 3B is a top view of a second exemplary embodiment of a latching relay;

FIG. 3C is a perspective view of an exemplary cantilever suitable for use with the second exemplary embodiment of a latching relay;

FIG. 4A is a side view of a third exemplary embodiment of a latching relay;

FIG. 4B is a top view of a third exemplary embodiment of a latching relay;

FIGS. 4C and 4D are perspective view s of exemplary cantilevers suitable for use with the third exemplary embodiment of a latching relay; and FIG. 5 is a side view of a fourth exemplary embodiment of a latching relay.

DETAILED DESCRIPTION OF EXEMPLARY EMBODIMENTS

It should be appreciated that the particular implementations shown and described herein are examples of the invention and are not intended to otherwise limit the scope of the present invention in any way. Indeed, for the sake of brevity, conventional electronics, manufacturing, MEMS technologies and other functional aspects of the systems (and components of the individual operating components of the systems) may not be described in detail herein. Furthermore, for purposes of brevity, the invention is frequently described herein as pertaining to a micro-electronically-machined relay for use in electrical or electronic systems. It should be appreciated that many other manufacturing techniques could be used to create the relays described herein, and that the techniques described herein could be used in mechanical relays, optical relays or any other switching device. Further, the techniques would be suitable for application in electrical systems, optical systems, consumer electronics, industrial electronics, wireless systems, space applications, or any other application. Moreover, it should be understood that the spatial descriptions made herein are for purposes of illustration only, and that practical latching relays may be spatially arranged in any orientation or manner. Arrays of these relays can also be formed by connecting them in appropriate ways and with appropriate devices.

A Latching Relay

Figure 1A:
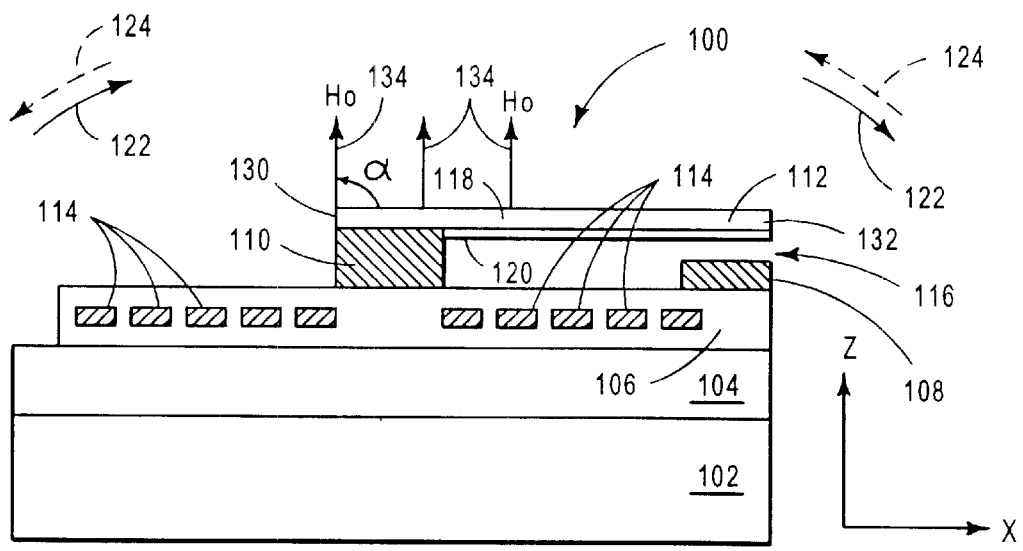
FIG. 1A is a side view of an exemplary embodiment of a latching relay.
Figure 1B:
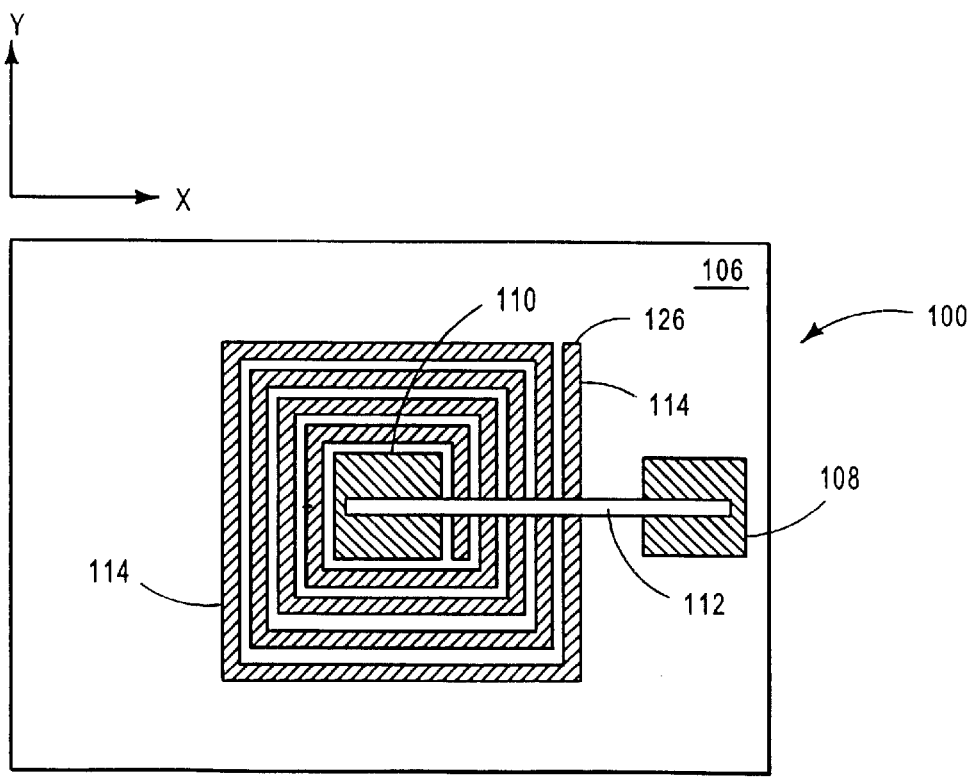
FIG. 1B is a top view of an exemplary embodiment of a latching relay.

FIGS. 1A and 1B show side and top views, respectively, of a latching relay. With reference to FIGS. 1A and 1B, an exemplary latching relay 100 suitably includes a magnet 102, a substrate 104, an insulating layer 106 housing a conductor 114, a contact 108 and a cantilever 112 positioned above substrate by a staging layer 110.

Magnet 102 is any type of magnet such as a permanent magnet, an electromagnet, or any other type of magnet capable of generating a magnetic field $H_o$ 134, as described more fully below. In an exemplary embodiment, magnet 102 is a Model 59-P09213T001 magnet available from the Dexter Magnetic Technologies corporation of Fremont, Calif., although of course ther types of magnets could be used. Magnetic field 134 may be generated in any manner and with any magnitude, such as from about 1 Oersted to $10^4$ Oersted or more. In the exemplary embodiment shown in FIG. 1, magnetic field $H_o$ 134 may be generated approximately parallel to the Z axis and with a magnitude on the order of about 370 Oersted, although other embodiments will use varying orientations and magnitudes for magnetic field 134. In various embodiments, a single magnet 102 may be used in conjunction with a number of relays 100 sharing a common substrate 104.

Substrate 104 is formed of any type of substrate material such as silicon, gallium arsenide, glass, plastic, metal or any other substrate material. In various embodiments, substrate 104 may be coated with an insulating material (such as an oxide) and planarized or otherwise made flat. In various embodiments, a number of latching relays 100 may share a single substrate 104. Alternatively, other devices (such as transistors, diodes, or other electronic devices) could be formed upon substrate 104 along with one or more relays 100 using, for example, conventional integrated circuit manufacturing techniques. Alternatively, magnet 102 could be used as a substrate and the additional components discussed below could be formed directly on magnet 102. In such embodiments, a separate substrate 104 may not be required.

Insulating layer 106 is formed of any material such as oxide or another insulator. In an exemplary embodiment, insulating layer is formed of Probimide 7510 material. Insulating layer 106 suitably houses conductor 114. Conductor 114 is shown in FIGS. 1A and 1B to be a single conductor having two ends 126 and 128 arranged in a coil pattern. Alternate embodiments of conductor 114 use single or multiple conducting segments arranged in any suitable pattern such as a meander pattern, a serpentine pattern, a random pattern, or any other pattern. Conductor 114 is formed of any material capable of conducting electricity such as gold, silver, copper, aluminum, metal or the like. As conductor 114 conducts electricity, a magnetic field is generated around conductor 114 as discussed more fully below.

Cantilever 112 is any armature, extension, outcropping or member that is capable of being affected by magnetic force. In the embodiment shown in FIG. 1A, cantilever 112 suitably includes a magnetic layer 118 and a conducting layer 120. Magnetic layer 118 may be formulated of permalloy (such as NiFe alloy ) or any other magnetically sensitive material. Conducting layer 120 may be formulated of gold, silver, copper, aluminum, metal or any other conducting material. In various embodiments, cantilever 112 exhibits two states corresponding to whether relay 100 is "open" or "closed", as described more fully below. In many embodiments, relay 100 is said to be "closed" when a conducting layer 120 connects staging layer 110 to contact 108. Conversely, the relay may be said to be "open" when cantilever 112 is not in electrical contact with contact 108. Because cantilever 112 may physically move in and out of contact with contact 108, various embodiments of cantilever 112 will be made flexible so that cantilever 112 can bend as appropriate. Flexibility maybe created by varying the thickness of the cantilever (or its various component layers), by patterning or otherwise making holes or cuts in the cantilever, or by using increasingly flexible materials. Alternatively, cantilever 112 can be made into a "hinged" arrangement such as that described below in conjunction with FIG. 3. Although of course the dimensions of cantilever 112 may vary dramatically from implementation to implementation, an exemplary cantilever 112 suitable for use in a micromagnetic relay 100 may be on the order of 10–1000 microns in length, 1–40 microns in thickness, and 2–600 microns in width. For example, an exemplary cantilever in accordance with the embodiment shown in FIG. 1 may have dimensions of about 600 microns×10 microns×50 microns, or 1000 microns×600 microns×25 microns, or any other suitable dimensions.

Contact 108 and staging layer 110 are placed on insulating layer 106, as appropriate. In various embodiments, staging layer 110 supports cantilever 112 above insulating layer 106, creating a gap 116 that may be vacuum or may become filled with air or another gas or liquid such as oil. Although the size of gap 116 varies widely with different implementations, an exemplary gap 116 may be on the order of 1–100 microns, such as about 20 microns. Contact 108 may receive cantilever 112 when relay 100 is in a closed state, as described below. Contact 108 and staging layer 110 may be formed of any conducting material such as gold, gold alloy, silver, copper, aluminum, metal or the like. In various embodiments, contact 108 and staging layer 110 are formed of similar conducting materials, and the relay is considered to be "closed" when cantilever 112 completes a circuit between staging layer 110 and contact 108. Other embodiments use different formulations for contact 108 and staging layer 110, such as those discussed below in conjunction with FIGS. 3 and 4. In certain embodiments wherein cantilever 112 does not conduct electricity, staging layer 110 may be formulated of non-conducting material such as Probimide material, oxide, or any other material. Additionally, alternate embodiments may not require staging layer 110 if cantilever 112 is otherwise supported above insulating layer 106.

Principle of Operation

In a broad aspect of the invention, magnet 102 generates a magnetic field $H_o$ 126 that induces a magnetization (m) in cantilever 112. The magnetization suitably creates a torque on cantilever 112 that forces cantilever 112 toward contact 108 or away froth contact 108, depending upon the direction of the magnetization, thus placing relay 100 into an open or closed state. The direction of magnetization in cantilever 112 may be adjusted by a second magnetic field generated by conductor 114 as appropriate, and as described more fully below.

With continued reference to FIGS. 1A and 1B, magnetic field $H_o$ 134 may be applied by magnet 102 primarily in the direction parallel to the Z-axis such that the field is perpendicular to the primary dimension (e.g. the length) of cantilever 112. Magnetic field 134 suitably induces a magnetization in cantilever 112, which may be made of soft magnetic material. Because of the geometry of cantilever 112, the magnetization in cantilever 112 suitably aligns along the long axis of the cantilever, which is, the length of cantilever 112 (parallel to the X-axis) in FIG. 1.

The orientation of the magnetization in cantilever 112 is suitably dependent upon the angle (alpha) between the applied magnetic field 134 and the long axis of cantilever 112. Specifically, when the angle (alpha) is less than 90 degrees, the magnetic moment (m) in cantilever 112 points from end 130 of cantilever 112 toward end 132. The interaction between the magnetic moment and magnetic field $H_o$ 134 thus creates a torque in a counter-clockwise direction about end 130 of cantilever 112 that moves end 132 upward, as appropriate, thus opening the circuit between staging layer 110 and contact 108. Conversely, when the angle (alpha) is greater than 90 degrees, the magnetic moment (m) in cantilever 112 points from end 132 toward end 130, creating a clockwise torque about end 130. The clockwise torque moves end 132 downward to complete the circuit between staging layer 110 and contact 108. Because the magnetization (m) of cantilever 112 does not change unless the angle (alpha) between the long axis of cantilever 112 and the applied magnetic field 134 changes, the applied torque will remain until an external perturbation is applied. Elastic torque of the cantilever or a stopper (such as the contact) balances the applied magnetic torque, and thus relay 100 exhibits two stable states corresponding to the upward and downward positions of cantilever 112 (and therefore to the open and closed states, respectively, of relay 100).

Switching is accomplished by any suitable switching technique. In an exemplary embodiment, switching is accomplished by generating a second magnetic field that has a component along the long axis of cantilever 112 that is strong enough to affect the magnetization (m) of cantilever 112. In the embodiment shown in FIG. 1, the relevant component of the second magnetic field is the component of the field along the X-axis. Because the strength of the second magnetic field along the long axis of cantilever 112 is of primary concern, the overall magnitude of the second magnetic field is typically significantly less than the magnitude of magnetic field 134 (although of course fields of any strength could be used in various embodiments). An exemplary second magnetic field may be on the order of 20 Oersted, although of course stronger or weaker fields could be used in other embodiments.

The second magnetic field may be generated through, for example, a magnet such as an electronically-controlled electromagnet. Alternatively, the second magnetic field may be generated by passing a current through conductor 114. As current passes through conductor 114, a magnetic field is produced in accordance with a "right-hand rule". For example, a current flowing from point 126 to point 128 on conductor 114 (FIG. 1B) typically generates a magnetic field "into" the center of the coil shown, corresponding to field arrows 122 in FIG. 1A. Conversely, a current flowing from point 128 to point 126 in FIG. 1 generates a magnetic 20 field flowing "out" of the center of the coil shown, corresponding to dashed field arrows 124 in FIG. 1A. The magnetic field may loop around the conductor 114 in a manner shown also in FIG. 1A, imposing a horizontal (X) component of the magnetic field on the cantilever 112.

By varying the direction of the current or current pulse flowing in conductor 114, then, the direction of the second magnetic field can be altered as desired. By altering the direction of the second magnetic field, the magnetization of cantilever 112 may be affected and relay 100 may be suitably switched open or closed. When the second magnetic field is in the direction of field arrows 122, for example, the magnetization of cantilever 112 will point toward end 130. This magnetization creates a clockwise torque about end 130 that places cantilever 112 in a "down" state that suitably closes relay 100. Conversely, when the second magnetic field is in the direction of dashed field arrows 124, the magnetization of cantilever 112 points toward end 132, and a counter-clockwise torque is produced that places cantilever 112 in an "up" state that suitably opens relay 100. Hence, the "up" or "down" state of cantilever 112 (and hence the "open" or "closed" state of relay 100) may be adjusted by controlling the current flowing through conductor 114. Further, since the magnetization of cantilever 112 remains constant without external perturbation, the second magnetic field may be applied in "pulses" or otherwise intermittently as required to switch the relay. When the relay does not require a change of state, power to conductor 114 may be eliminated, thus creating a bi-stable latching relay 100 without power consumption in quiescent states. Such a relay is well suited for applications in space, aeronautics, portable electronics, and the like.

Manufacturing a Latching Relay

FIG. 2 includes a number of side views showing an exemplary technique for manufacturing a latching relay 100. It will be understood that the process disclosed herein is provided solely as an example of one of the many techniques that could be used to formulate a latching relay 100.

An exemplary fabrication process suitably begins by providing a substrate 102, which may require an optional insulating layer. As discussed above, any substrate material could be used to create a latching relay 100, so the insulating layer will not be necessary if, for example, an insulating substrate is used. In embodiments that include an insulating layer, the layer may be a layer of silicon dioxide ($SiO_2$) or other insulating material that may be on the order of 1000 angstroms in thickness. Again, the material chosen for the insulating material and the thickness of the layer may vary according to the particular implementation.

Figure 2A:
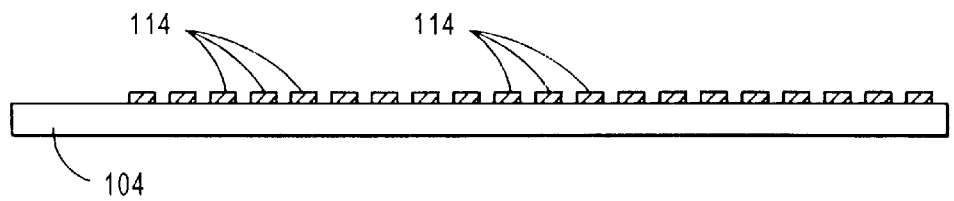
Figure 2B:
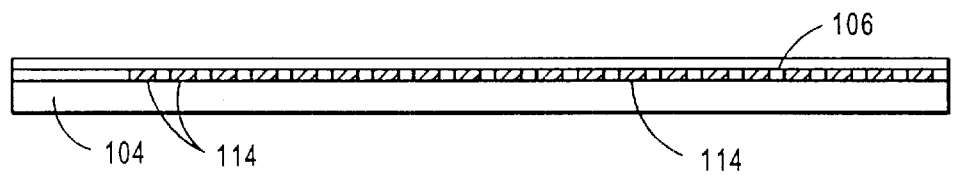

With reference to FIG. 2A, conductor 114 is suitably formed on substrate 104. Conductor 114 may be formed by any technique such as deposition (such as e-beam deposition), evaporation, electroplating or electroless plating, or the like. In various embodiments, conductor 114 is formed in a coil pattern similar to that shown in FIG. 1. Alternatively, conductor 114 is formed in a line, serpentine, circular, meander, random or other pattern. An insulating layer 106 may be spun or otherwise applied to substrate 104 and conductor 114 as shown in FIG. 2B. Insulating layer 106 may be applied as a layer of photoresist, silicon dioxide, Probimide-7510 material, or any other insulating material that is capable of electrically isolating the top devices. In various embodiments, the surface of the insulating material is planarized through any technique such as chemical-mechanical planarization (CMP).

Figure 2C:
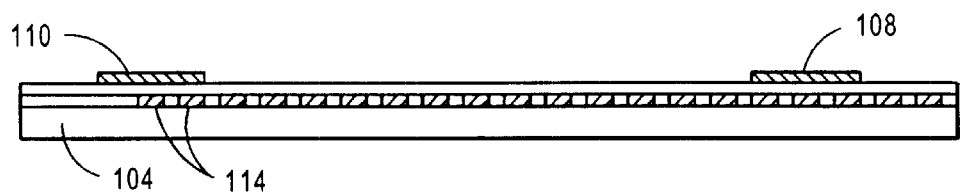

Contact pads 108 and 110 may be formed on insulating layer 106 through any technique such as photolithography, etching, or the like (FIG. 2C). Pads 108 and 110 may be formed by depositing one or more layers of conductive material on insulating layer 106 and then patterning the pads by wet etching, for example. In an exemplary embodiment, pads 108 and 110 suitably include a first layer of chromium (to improve adhesion to insulating layer 106) and a second layer of gold, silver, copper, aluminum, or another conducting material. Additional metal layers may be added to the contacts by electroplating or electroless plating methods to improve the contact reliability and lower the resistance.

Figure 2D:
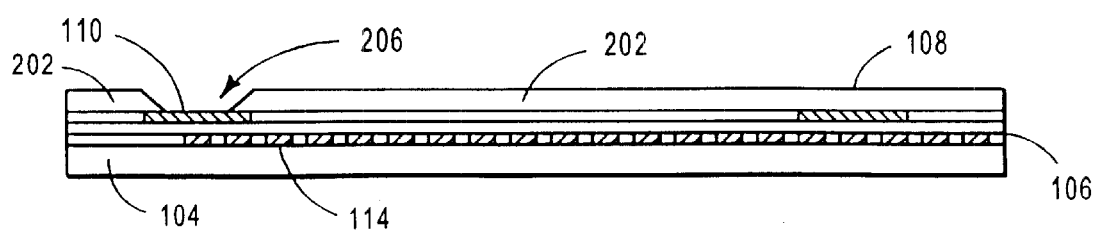
Figure 2E:
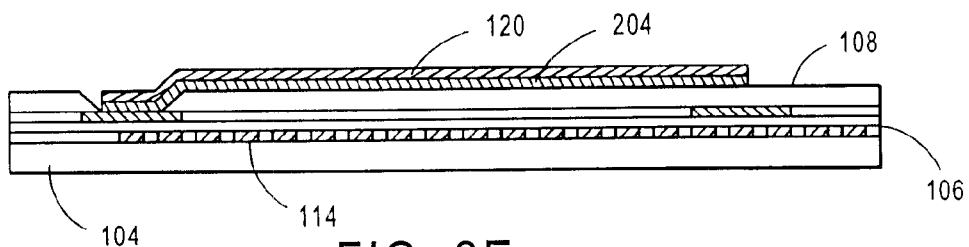
Figure 2F:
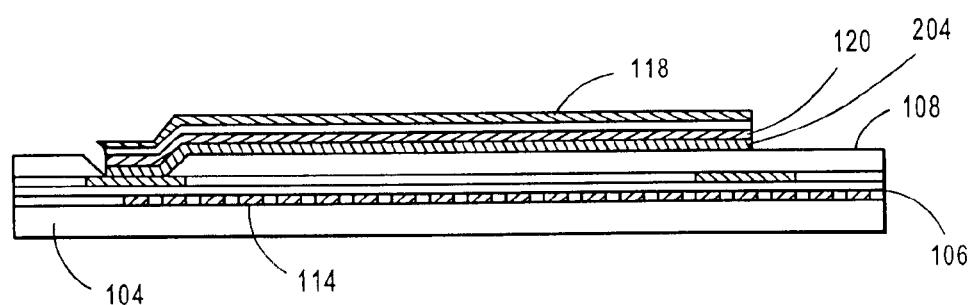

With reference to FIG. 2D, the contact pads 108 and 110 may be suitably covered with a layer of photoresist, aluminum, copper, or other material to form sacrificial layer 202. An opening 206 in sacrificial layer 202 over the cantilever base areas may be defined by photolithography, etching, or another process. Cantilever 112 may then be formed by depositing, sputtering or otherwise placing one or more layers of material on top of sacrificial layer 202 and extending over the opening 206, as shown in FIG. 2E. In an exemplary embodiment, a base layer 204 of chromium or another metal may be placed on sacrificial layer 202 to improve adhesion, and one or more conducting layers 120 may be formed as well. Layers 204 and 120 may be formed by, for example, deposition followed by chemical or mechanical etching. Layer 120 may be thickened by adding another conductor layer (such as gold, gold alloy, etc.) by electroplating or electroless plating methods. Cantilever 112 is further formed by electroplating or otherwise placing a layer 118 of permalloy (such as NiFe permalloy) on top of conducting layer 120, as shown in FIG. 2F. The thickness of the permalloy layer 118 may be controlled by varying the plating current and time of electroplating. Electroplating at 0.02 amperes per square centimeters for a period of 60 minutes, for example, may result in an exemplary permalloy layer thickness of about 20 microns. In various embodiments, an additional permalloy layer 306 (shown in FIG. 3) may be electroplated on top of cantilever 112 to increase the responsiveness of cantilever 112 to magnetic fields.

Figure 2G:
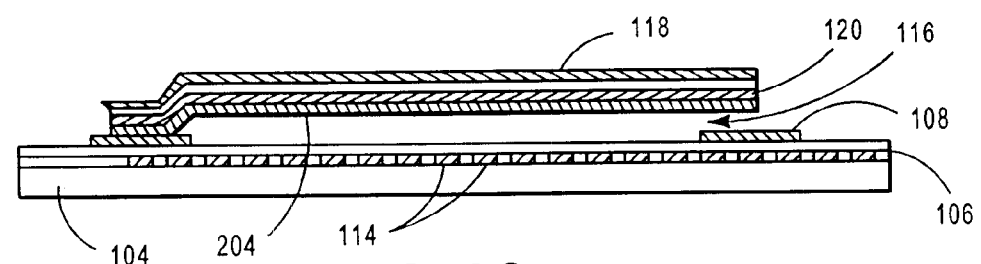
Figure 2H:
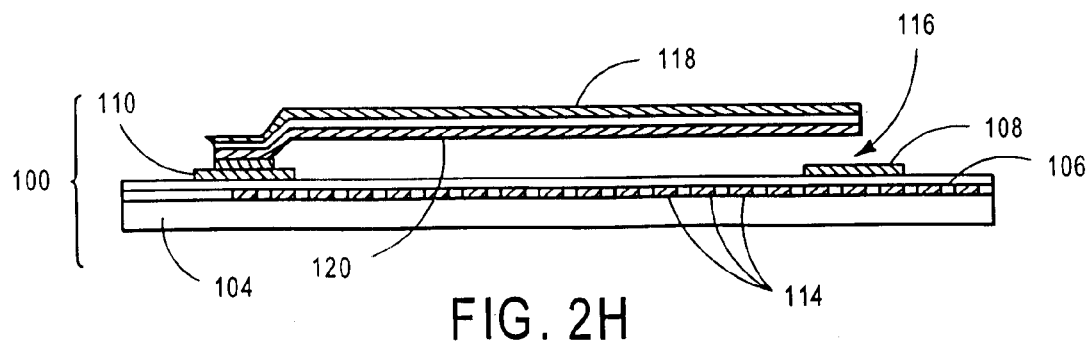

With reference to FIG. 2G, sacrificial layer 202 may be removed by, for example, wet or dry (i.e. oxygen plasma) releasing to create gap 116 between cantilever 112 and insulating layer 106. In various embodiments, adhesion layer 204 is suitably removed with micro-mechanical etching or another technique to form relay 100 (FIG. 2H). Relay 100 may then be diced, packaged with magnet 102 (shown in FIG. 1), or otherwise processed as appropriate. It should be understood that the permanent magnet 102 can also be fabricated directly on the substrate, placed on top of the cantilever, or the coil and the cantilever can be fabricated directly on a permanent magnet substrate.

Alternate Embodiments of Latching Relays

FIGS. 3 and 4 disclose alternate embodiments of latching relays 100. FIGS. 3A and 3B show side and top views, respectively, of an alternate embodiment of a latching relay that includes a hinged cantilever 112. The perspective of FIGS. 3A and 3B is rotated 90 degrees in the X-Y plane from the perspective shown in FIGS. 1A and 1B to better show the detail of the hinged cantilever. With reference to FIGS. 3A and 3B, a hinged cantilever 112 suitably includes one or more strings 302 and 304 that support a magnetically sensitive member 306 above insulating layer 106. Member 306 may be relatively thick (on the order of about 50 microns) compared to strings 302 and 304, which may be formed of conductive material. As with the relays 100 discussed above in conjunction with FIG. 1, relays 100 with hinged cantilevers may be responsive to magnetic fields such as those generated by magnet 102 and conductor 114. In various embodiments, one or both of strings 302 and 304 are in electrical communication with contact pad 108 when the relay is in a "closed" state. Of course, any number of strings could be used. For example, a single string could be formulated to support the entire weight of member 306. Additionally, the strings may be located at any point on member 306. Although FIG. 3 shows strings 302 and 304 near the center of member 306, the strings could be located near the end of member 306 toward contact 108 to increase the torque produced by magnet 102, for example.

FIG. 3C is a perspective view of an exemplary cantilever 112 suitable for use with the embodiments shown in FIGS. 3A and 3B. Cantilever 112 suitably includes member 306 coupled to conducting layer 120. Holes 310 and/or 312 may be formed in conducting layer 120 to improve flexibility of cantilever 112, and optional contact bumps 308 may be formed on the surface of conducting layer 120 to come into contact with contact 108. Strings 302 and 304 (not shown in FIG. 3C) may be affixed or otherwise formed on cantilever 112 at any position (such as in the center of conducting layer 120 or at either end of conducting layer 120) as appropriate. Alternatively, the strings may be formed of non-conducting materials and cantilever 112 may provide a conducting path between two separate conductors touched simultaneously by the cantilever in the closed state, as discussed below.

FIGS. 4A and 4B are side and top views, respectively, of an alternate embodiment of a latching relay 100. As shown in the FIG., various embodiments of cantilever 112 may not directly conduct electricity from staging layer 110 to contact 108. In such embodiments, a conducting element 402 may be attached to cantilever 112 to suitably provide electrical contact between contacts 108 and 408 when relay 100 is in a "closed" state. FIGS. 4C and 4D are perspective views of alternate exemplary embodiments of cantilever 112. In such embodiments, cantilever 112 may include a magnetically sensitive portion 118 separated from a conducting portion 402 by an insulating layer 410, which may be a dielectric insulator, for example. Optional contact bumps 308 may also be formed on conducting portion 402 as shown. When cantilever 112 is in a state corresponding to the "closed" state of relay 100, current may follow the path shown by arrows 412 between contact pads 108 and 408, as appropriate.

FIG. 5 is a side view of an alternate exemplary embodiment of relay 100. With reference to FIG. 5, a relay 100 may include a magnet 102, a substrate 104 and a cantilever 112 as described above (for example in conjunction with FIG. 1). In place of (or in addition to) conductor 114 formed on substrate 104, however, conductor 114 may be formed on a second substrate 504, as shown. Second substrate 504 may be any type of substrate such as plastic, glass, silicon, or the like. As with the embodiments described above, conductor 114 may be coated with an insulating layer 506, as appropriate. To create a relay 100, the various components may be formed on substrates 104 and 504, and then the substrates may be aligned and positioned as appropriate. The two substrates 104 and 504 (and the various components formed thereon) may be separated from each other by spacers such as spacers 510 and 512 in FIG. 5, which may be formed of any material.

With continued reference to FIG. 5, contact 108 may be formed on insulating layer 106, as described above. Alternatively, contact 508 may be formed on second substrate 504, as shown in FIG. 5 (of course cantilever 112 may be reformulated such that a conducting portion of cantilever 112 comes into contact with contact 508). In other embodiments, contacts 108 and 508 may both be provided such that relay 100 is in a first state when cantilever 112 is in contact with contact 108, a second state when cantilever 112 is in contact with contact 508, and/or a third state when cantilever 112 is in contact with neither contact 108 nor contact 508. Of course the general layout of relay 100 shown in FIG. 5 could be combined with any of the techniques and layouts described above to create new embodiments of relay 100.

It will be understood that many other embodiments could be formulated without departing from the scope of the invention. For example, a double-throw relay could be created by adding an additional contact 108 that comes into contact with cantilever 112 when the cantilever is in its open state. Similarly, various topographies and geometries of relay 100 could be formulated by varying the layout of the various components (such as pads 108 and 110 and cantilever 112).

The corresponding structures, materials, acts and equivalents of all elements in the claims below are intended to include any structure, material or acts for performing the functions in combination with other claimed elements as specifically claimed. Moreover, the steps recited in any method claims may be executed in any order. The scope of the invention should be determined by the appended claims and their legal equivalents, rather than by the examples given above.

What is claimed is:

1. A relay having an open state and a closed state, the relay comprising:
   a cantilever having a magnetic material and a longitudinal axis, wherein said cantilever has first and second states corresponding to said open and closed states of said relay, respectively;
   a magnet configured to provide a first magnetic field such that said first magnetic field produces a torque in said magnetic material of said cantilever that maintains said cantilever in one of said first and second states, wherein said first magnetic field is approximately perpendicular to said longitudinal axis; and
   a coil configured to provide a second magnetic field, wherein a component of said second magnetic field parallel to said longitudinal axis adjusts the direction of said torque produced by said first magnetic field in said magnetic material of said cantilever such that said coil switches said cantilever between said first and second states.

2. The relay of claim 1 wherein said coil and said cantilever are formed on a substrate.

3. The relay of claim 2 wherein said magnet is provided proximate to said substrate.

4. The relay of claim 1 wherein the magnitude of said second magnetic field is smaller than the magnitude of said first magnetic field.

5. The relay of claim 1 wherein said coil is configured to produce said second electromagnetic field as a current flows through said coil.

6. The relay of claim 5 wherein said coil is configured such that the direction of said torque is determined by the direction of said current flowing in said coil.

7. A relay having an open state and a closed state, the relay comprising:
   a cantilever having a magnetic material and a longitudinal axis, wherein said cantilever is operable to move between first and second positions corresponding to said open and closed states of said relay, respectively,
   a permanent magnet configured to generate a first electromagnetic field that produces a torque in said magnetic material of said cantilever; and
   an electromagnet configured to provide a second magnetic field having a component parallel to said longitudinal axis, wherein temporary application of said second magnetic field adjusts the direction of said torque produced by said first electromagnetic field in said magnetic material of said cantilever such that said cantilever is switched between said first and second positions.

8. A relay of claim 7 wherein said cantilever is switched between said first and second positions by varying the direction of a current flowing in said electromagnet.

9. A relay of claim 8 wherein the magnitude of said second magnetic field is less than the magnitude of said first magnetic field.

10. A relay of claim 8 wherein said cantilever comprises first and second hinges coupled to a substrate, wherein said hinges are configured to facilitate movement between said first and second positions of said cantilever.

11. A relay of claim 10 wherein said substrate is located proximate to said magnet.

12. A relay having open and closed states corresponding to first and second states of a cantilever, respectively, wherein said cantilever comprises a magnetically sensitive material and a longitudinal axis such that said cantilever is sensitive to magnetic fields, said relay comprising:
    means for producing a magnetic effect in said magnetically sensitive material with a first magnetic field approximately perpendicular to said longitudinal axis, said magnetic effect producing a torque in said cantilever; and
    means for changing the direction of said magnetic effect with a second magnetic field, wherein a component of said second magnetic field parallel to said longitudinal axis changes the direction of said torque to thereby switch said cantilever between said first state and said second state such that said relay is switched between said open state and said closed state, respectively.

13. The relay of claim 12 wherein said component of said second magnetic field is selectively applied in a first direction and a second direction corresponding to said first and second states of said cantilever, respectively.

14. The relay of claim 13 wherein said affecting step comprises realigning the magnetization of said cantilever with said component to adjust the direction of said cantilever.

15. The relay of claim 12 wherein said magnetically sensitive material comprises permalloy.

16. The relay of claim 15 wherein said first and second magnetic fields are applied external to said magnetically-sensitive material.

17. The relay of claim 14 wherein said first magnetic field is produced by a permanent mast.

18. The relay of claim 17 wherein said second magnetic field is produced by a current flowing through an electromagnet in a first or second direction corresponding to said first or second states of said conductor, respectively.

19. The relay of claim 12 wherein said cantilever remains in said first and second states when said second magnetic field is discontinued such that said relay is a latching relay.

20. The relay of claim 12 wherein said relay is a bi-stable latching relay.

21. The relay of claim 1 wherein said reply is a microelectromechanical system (MEMS) device.

22. The relay of claim 7 wherein said reply is a microelectromechanical system (MEMS) device.

23. The relay of claim 12 wherein said reply is a microelectromechanical system (MEMS) device.

* * * * *